(12) United States Patent
Arnold et al.

(10) Patent No.: US 7,418,869 B2
(45) Date of Patent: Sep. 2, 2008

(54) WIDE-RANGE COMBINATION VACUUM GAUGE

(75) Inventors: Paul C. Arnold, Boulder, CO (US); Michael D. Borenstein, Boulder, CO (US); Paul M. Rutt, Longmont, CO (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 11/439,875

(22) Filed: May 24, 2006

(65) Prior Publication Data

US 2007/0012116 A1    Jan. 18, 2007

Related U.S. Application Data

(63) Continuation-in-part of application No. 11/150,868, filed on Jun. 10, 2005, now Pat. No. 7,207,224.

(51) Int. Cl.
*G01L 7/00* (2006.01)
(52) U.S. Cl. .................. 73/700; 73/715; 73/716
(58) Field of Classification Search ............ 73/700–756
See application file for complete search history.

(56) References Cited

U.S. PATENT DOCUMENTS

| | | | |
|---|---|---|---|
| 2,503,372 A | | 4/1950 | Glen |
| 3,064,478 A | | 11/1962 | Schafer |
| 3,548,634 A | * | 12/1970 | Roy ........................ 73/38 |
| 3,580,075 A | | 5/1971 | Steinberg |
| 3,610,922 A | | 10/1971 | Werner |
| 4,556,807 A | | 12/1985 | Yamada et al. |
| 4,689,999 A | | 9/1987 | Shkedi |
| 4,747,311 A | | 5/1988 | Hojoh |
| 4,752,141 A | | 6/1988 | Sun et al. |

(Continued)

FOREIGN PATENT DOCUMENTS

EP    1 203 212 B1    3/2005

(Continued)

OTHER PUBLICATIONS

Installation Guide: Setra Systems Model 264 Differential Pressure Transducer, Setra, 159 Swanson Road, Boxborough, MA 01719.

(Continued)

*Primary Examiner*—Andre J. Allen
*Assistant Examiner*—Jermaine Jenkins
(74) *Attorney, Agent, or Firm*—Hamilton, Brook, Smith & Reynolds, P.C.

(57) ABSTRACT

A combination vacuum gauge provides simultaneous absolute and differential pressure measurements over a wide-range of pressures ranging from atmospheric pressures to ultrahigh vacuum by processing the readings of (i) an absolute high vacuum gauge (e.g., an ionization gauge and/or a heat-loss sensor) and an absolute or a differential low vacuum gauge (e.g., a diaphragm sensor) exposed, through a common port, to pressures in a measurement region, and (ii) a barometric absolute pressure sensor exposed to the ambient atmosphere outside the measurement region. The barometric absolute pressure sensor reading may be used to convert the differential vacuum gauge reading from uncalibrated differential pressure to calibrated absolute pressure or to convert the absolute vacuum gauge reading from absolute pressure to differential pressure.

17 Claims, 5 Drawing Sheets

U.S. PATENT DOCUMENTS

| | | | |
|---|---|---|---|
| 4,755,669 | A | 7/1988 | Grant et al. |
| 4,866,640 | A | 9/1989 | Morrison, Jr. |
| 4,995,264 | A | 2/1991 | Stocker et al. |
| 5,024,100 | A | 6/1991 | Weinstein |
| 5,373,240 | A | 12/1994 | Guenter |
| 5,452,613 | A | 9/1995 | Bills et al. |
| 5,583,297 | A | 12/1996 | Stocker et al. |
| 5,606,516 | A | 2/1997 | Douglas et al. |
| 5,939,639 | A | 8/1999 | Lethbridge |
| 6,023,979 | A | 2/2000 | Bills et al. |
| 6,046,456 | A | 4/2000 | Bills |
| 6,081,121 | A | 6/2000 | Bills |
| 6,198,105 | B1 | 3/2001 | Bills |
| 6,227,056 | B1 | 5/2001 | Bills et al. |
| 6,272,928 | B1 | 8/2001 | Kurtz |
| 6,473,711 | B1 | 10/2002 | Sittler et al. |
| 6,515,482 | B2 | 2/2003 | Kawasaki |
| 6,672,171 | B2 | 1/2004 | Gu et al. |
| 6,909,975 | B2 | 6/2005 | Dozoretz et al. |
| 7,013,735 | B2 * | 3/2006 | Miyazawa ............... 73/717 |
| 7,076,920 | B2 | 7/2006 | Holcomb et al. |
| 2001/0011890 | A1 | 8/2001 | Kawasaki |
| 2002/0186017 | A1 | 12/2002 | Liebeskind |
| 2006/0123915 | A1 | 6/2006 | Arnold et al. |

FOREIGN PATENT DOCUMENTS

| | | |
|---|---|---|
| WO | WO 89/01615 | 2/1989 |
| WO | WO 01/13083 A1 | 2/2001 |

OTHER PUBLICATIONS

MKS Releases New Pressure/Vacuum Transducer, MKS Instruments, downloaded from http://www.mksinst.com/PRhps901.html, Mar. 22, 2005.

* cited by examiner

WIDE-RANGE COMBINATION VACUUM GAUGE

RELATED APPLICATIONS

This application is a continuation-in-part of U.S. application Ser. No. 11/150,868, filed Jun. 10, 2005 now U.S. Pat. No. 7,207,224. The entire teachings of the above application are incorporated herein by reference.

BACKGROUND OF THE INVENTION

In many industries certain processes require pressure measurements over a wide-range from about 1000 Torr to less than $10^{-9}$ Torr. For example, some semiconductor and electronic device manufacturing processes require accurate pressure measurements from ultrahigh vacuum to atmospheric pressures. To achieve the wide-range pressure measurement requirements of industry, there has been a recent movement to combine vacuum gauges having different pressure measurement ranges into a single product. These products typically include at least two different physical means for measuring pressure in a given environment.

In some applications it is necessary not only to measure pressures over a wide-range, but also to measure absolute and differential pressure simultaneously. For example, in certain applications, the pressure inside a chamber must be slightly greater than the pressure outside the chamber. Otherwise, if the pressure inside the chamber were less than the pressure outside the chamber and the chamber door were opened, then contaminants could enter the chamber. Also, if the pressure inside a chamber were much greater than the pressure outside the chamber and the chamber door were opened, then turbulence could damage the product being processed. In order to achieve the slight pressure differential between the inside and the outside of the chamber, it is necessary to obtain accurate differential pressure measurements.

SUMMARY OF THE INVENTION

There is a need for a combination vacuum gauge that simultaneously provides accurate absolute and differential pressure measurements over a wide-range of pressures extending, for example, from ultrahigh vacuum to atmospheric pressures. The combination vacuum gauge presented herein fulfills this need by combining a vacuum gauge exposed to pressures in a measurement region and a barometric absolute pressure sensor exposed to the ambient atmosphere outside the measurement region. A processor connected to the vacuum gauge and the barometric absolute pressure gauge provides absolute and differential gas pressure indications.

The vacuum gauge may be an absolute vacuum gauge or an absolute low vacuum gauge such as a diaphragm sensor with one side sealed off at high vacuum. The combination vacuum gauge may also include an absolute high vacuum gauge (e.g., a heat-loss sensor) connected to the processor and exposed, through a port shared with the absolute low vacuum gauge, to pressures in the measurement region.

The data output from the absolute high vacuum gauge and the absolute low vacuum gauge may overlap. The combination vacuum gauge may also include an absolute ultrahigh vacuum gauge, such as an ionization gauge.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
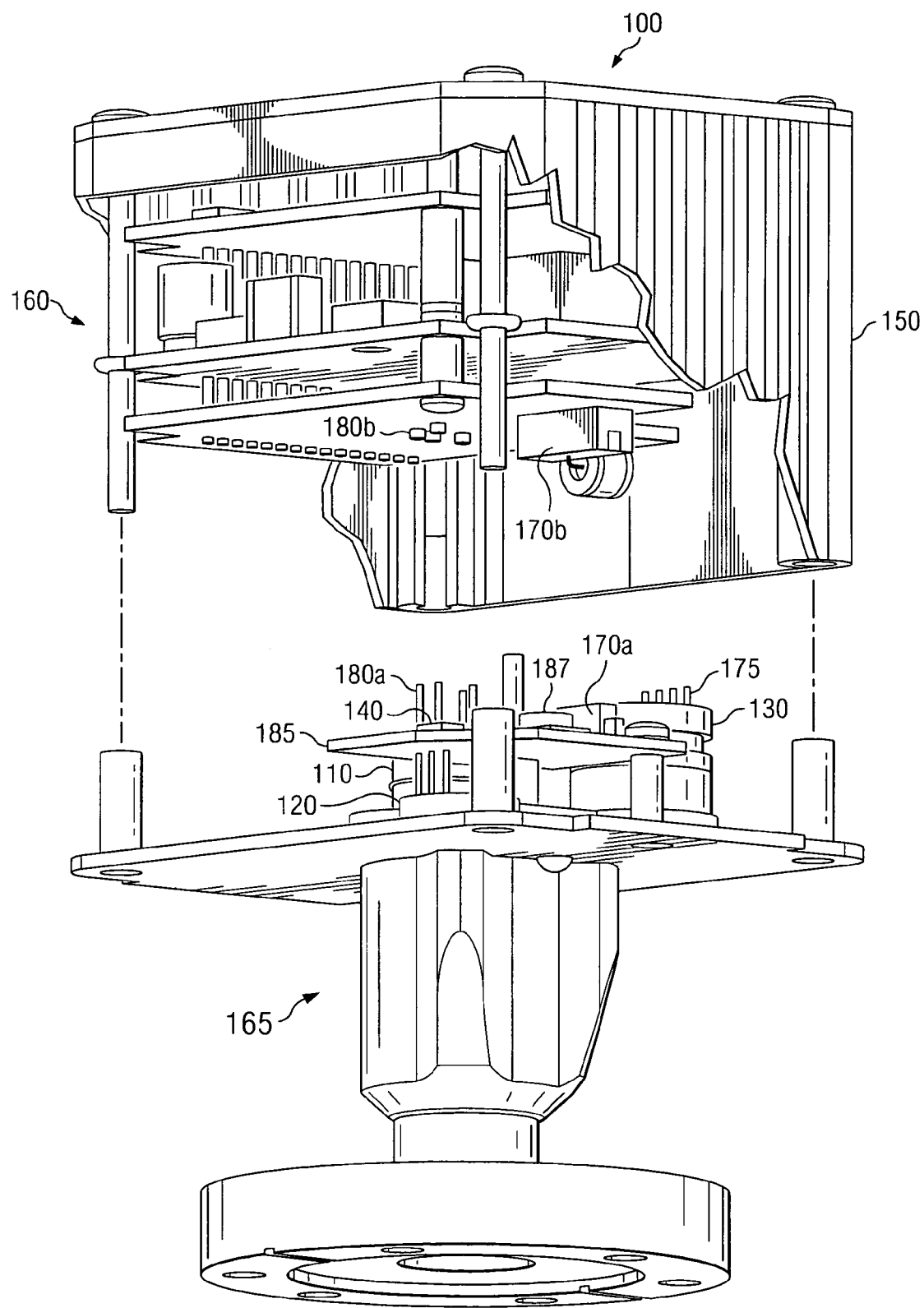
FIG. 1 is a perspective view of a combination vacuum gauge separated from the control electronics and cover, with the cover partially broken away.

Referring to FIG. 1, a combination vacuum gauge system 100 in accordance with the present invention includes a combination vacuum gauge 165 and controller electronics 160. The combination vacuum gauge 165 includes an ionization gauge 110, a heat-loss sensor 120, a differential diaphragm sensor 130 capable of measuring the pressure differential between a measurement region and ambient atmosphere, a barometric pressure sensor 187, and nonvolatile memory 140. The ionization gauge 110 may be a Bayard-Albert-type ionization gauge which is useful from below $10^{-9}$ Torr to 0.02 Torr. The heat-loss sensor 120 may be a Pirani or convection-enhanced Pirani heat-loss transducer which is useful from 0.002 Torr to 50 Torr. The differential diaphragm sensor 130 is useful from a difference of 4 Torr to 1 atmosphere and the barometric pressure sensor 187 is useful from about 600 Torr to 800 Torr. The differential diaphragm sensor 130 may be configured as an absolute vacuum gauge by sealing off the back side of the differential diaphragm sensor 130 at high vacuum.

The ionization gauge 110 electrically connects to the controller electronics 160 through pins 180a and sockets 180b. The heat-loss sensor 120, the nonvolatile memory 140, and the barometric pressure sensor 187 are connected to a combination vacuum gauge circuit board 185 which, in turn, connects to the controller electronics 160 through connectors 170a and 170b. The differential diaphragm sensor 130 electrically connects to the controller electronics 160 through pins 175 and a flex cable (not shown) to the connectors 170a and 170b. The controller electronics 160, when connected to the combination vacuum gauge 165, are enclosed within a housing 150.

Figure 2A:
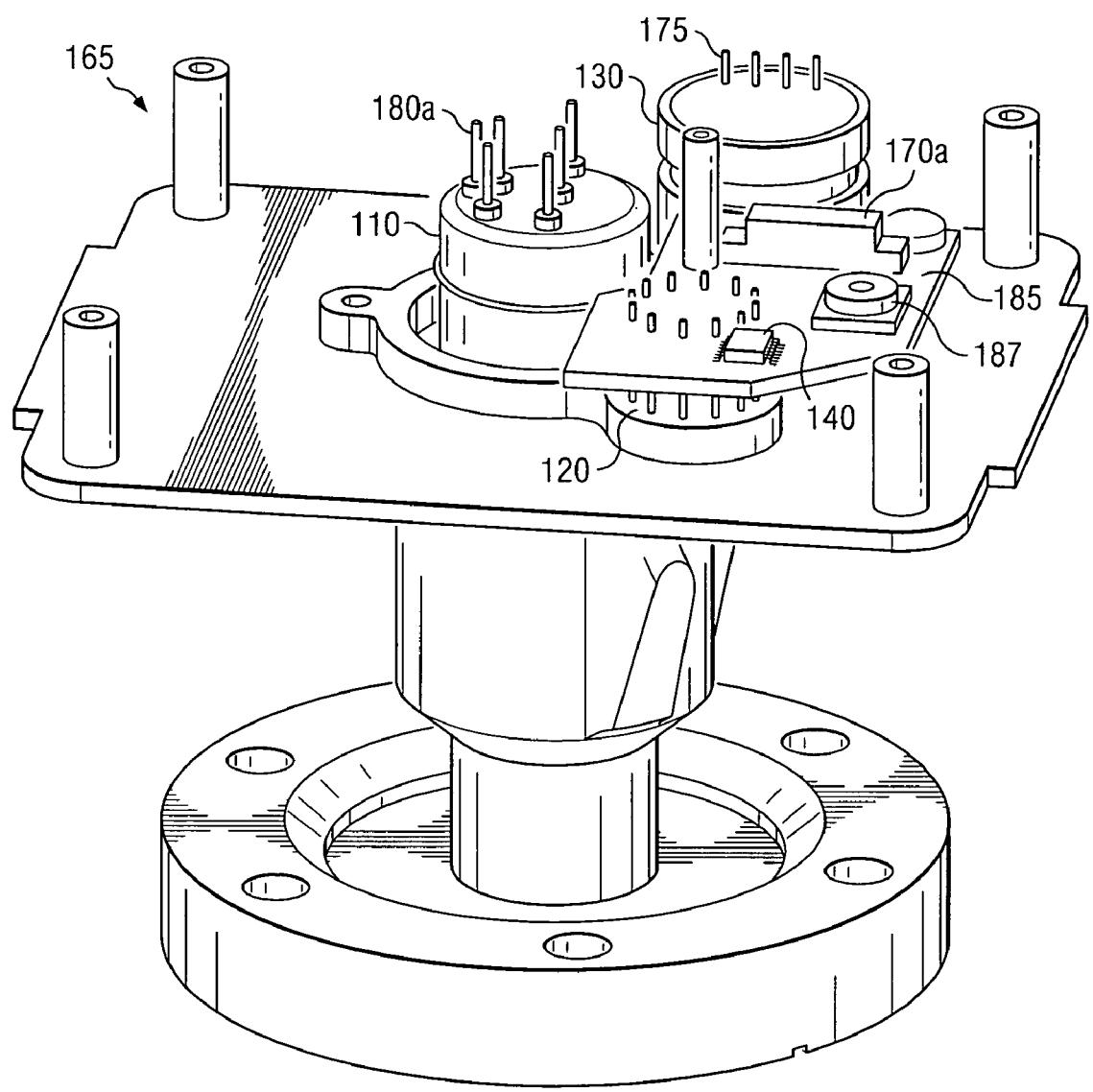
FIG. 2A is a perspective view of the combination vacuum gauge of FIG. 1.

FIG. 2A shows a perspective view of the combination vacuum gauge 165 that includes the ionization gauge 110 having six pins 180a, the differential diaphragm sensor 130 having four pins 175, the heat-loss sensor 120, the barometric pressure sensor 187, the nonvolatile memory 140, and the combination vacuum gauge circuit board 185 having the connector 170a. In another embodiment, nonvolatile memory 140 may be permanently affixed to each of the sensors 110, 120, 130 and 187. The nonvolatile memory 140 may be any Non-Volatile Random Access Memory (NVRAM) such as Electrically Erasable Programmable Read-Only Memory (EEPROM).

The nonvolatile memory 140 may contain calibration parameters unique to each of the sensors 110, 120, 130 and 187 as disclosed in U.S. patent application Ser. No. 11/012,871. The calibration parameters may be determined based on factory calibration of each of the individual sensors 110, 120, 130 and 187 (the barometric pressure sensor 187 may be calibrated by knowing the current absolute barometric pressure). By storing the calibration on the combination vacuum gauge 165 rather than in the controller electronics 160, the combination vacuum gauge 165 can be replaced in the field without replacement of the controller electronics 160. An alternative approach is to plug the nonvolatile memory 140 into the controller electronics 160 but to replace that memory as the combination vacuum gauge is replaced.

Figure 2B:
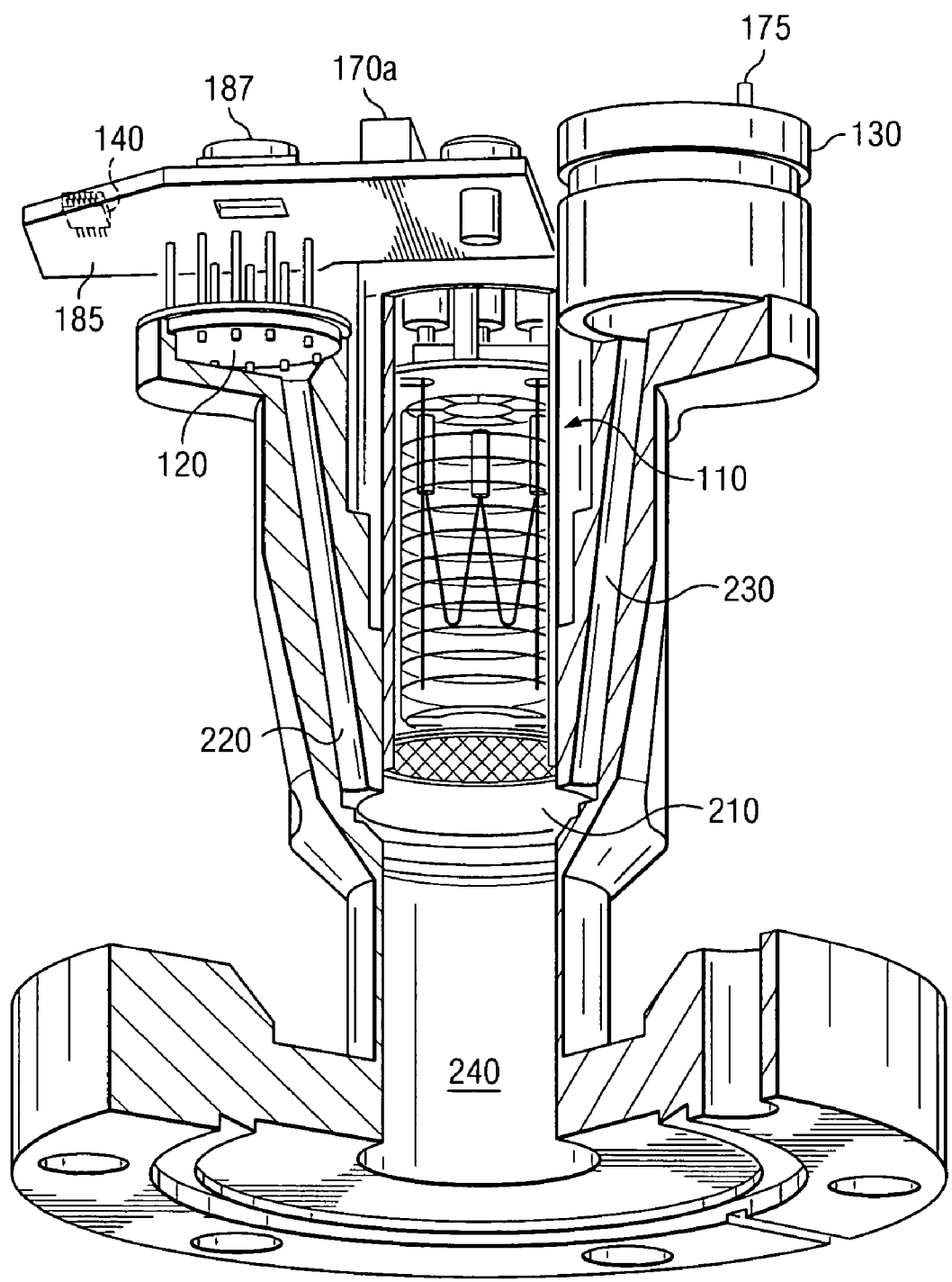
FIG. 2B is a sectional view of the combination vacuum gauge of FIG. 1.

FIG. 2B illustrates a sectional view of the combination vacuum gauge 165. The sensors 110, 120 and 130 together measure the pressure of a measurement region having pressures ranging from about atmospheric pressure (about 1,000 Torr) to ultrahigh vacuum (e.g., less than $10^{-9}$ Torr). The sensors connect with the measurement region through respective ports 210, 220, 230 and a common gauge port 240. The barometric pressure sensor 187, which may be a diaphragm sensor, however, does not measure the pressure of the measurement region, but measures the atmospheric pressure outside of this region. Thus, the barometric pressure sensor 187 is placed on the combination vacuum gauge circuit board 185 where it is exposed to the environment outside of the measurement region.

As described above, often a non-species dependent measurement of the difference between the pressures inside and outside of a vacuum chamber is required to prevent damage or contamination of material that is passed into or out of a vacuum chamber for processing. This measurement may be obtained with a differential diaphragm sensor with one side of the diaphragm exposed to the ambient room atmosphere and the other side exposed to the vacuum chamber. This measurement may also be obtained by computing the difference between the reading of a barometric pressure sensor exposed to the ambient room atmosphere and the reading of an absolute diaphragm sensor exposed to the vacuum chamber.

Since the diaphragm sensor is integrated into a full-range combination vacuum gauge, there is a strong desire to obtain both a composite pressure output that spans twelve or more decades of absolute pressure up to atmospheric pressure and a differential output. The combination vacuum gauge of the present invention uses a relatively inexpensive absolute transducer with a narrow range to sense atmospheric pressure. This absolute transducer does not need to be compatible with high vacuum or the vacuum processes because it is not exposed to the inside of the chamber. The absolute transducer is positioned at any location where it is exposed to the ambient atmosphere outside of the chamber or measurement region.

As described further herein, the reading of the absolute transducer may be combined with the reading of the differential diaphragm sensor to obtain an absolute reading. This absolute reading may be combined with readings from high vacuum gauges to obtain a composite absolute pressure measurement from ultrahigh vacuum to atmospheric pressures. In another embodiment, the reading of the absolute transducer may be subtracted from the reading of the absolute diaphragm sensor to obtain a differential reading.

Figure 3:
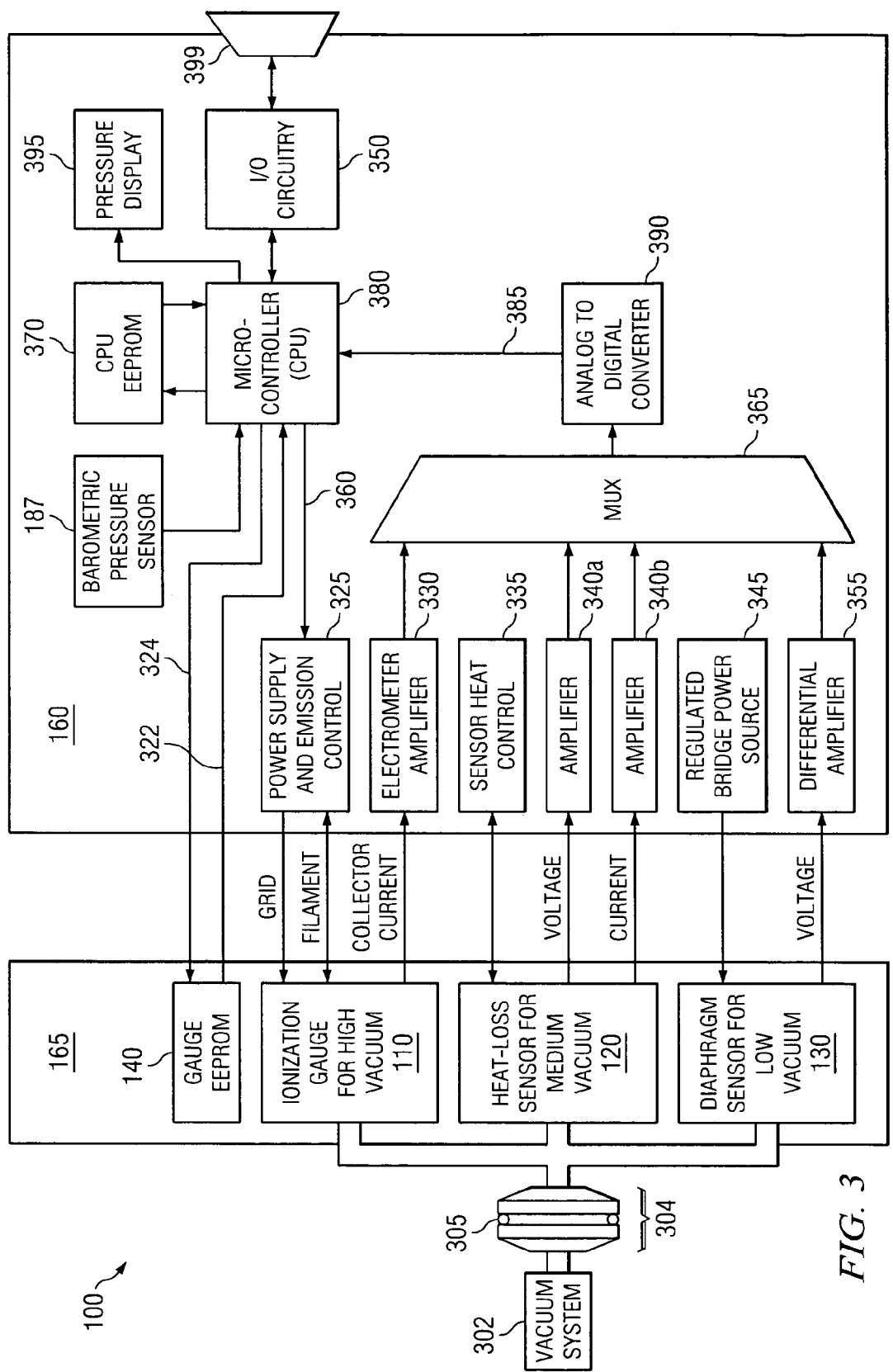
FIG. 3 is a block diagram of the combination vacuum gauge system with control electronics.

Referring to FIG. 3, controller electronics 160 connect to the combination vacuum gauge 165 via pin and socket connections. The combination vacuum gauge 165 in turn connects to the vacuum system 302 through a vacuum port connection 304 which includes a vacuum seal 305. The combination vacuum gauge 165 is thus field replaceable in the event that the combination vacuum gauge 165 malfunctions or fails.

In operation of the combination vacuum gauge system 100, a power supply and emission control block 325 provides voltage to the grid and power to the filament of the ionization gauge 110 and controls the amount of filament emission current through a feedback mechanism. The collector current of the ionization gauge 110 is provided as an input to an electrometer amplifier 330.

A sensor heat control 335 controls the power input to the heat-loss sensor 120. The heat-loss sensor 120 provides voltage and current measurements as inputs to amplifiers 340a and 340b.

Finally, a regulated bridge power source 345 provides power to the differential diaphragm sensor 130. A voltage measurement output from the differential diaphragm sensor 130 is input to a differential amplifier 355.

Each of the amplifiers 330, 340a, 340b, and 355 provides measurement signals from the combination vacuum gauge 165 to a multiplexer 365. Outputs from the multiplexer 365 are converted into digital form via an analog to digital converter 390. These digital signals are then input to a microcontroller (CPU) 380 for processing.

A CPU EEPROM 370 connects to the CPU 380 to store, in particular, calibration parameters unique to the controller electronics 160. By having separate calibration parameters for the combination vacuum gauge 165 and the controller electronics 160, the combination vacuum gauge 165 and the controller electronics 160 are interchangeable (i.e., any combination vacuum gauge 165 may be connected to any controller electronics 160). Furthermore, the controller electronics 160 may be calibrated independently of the combination vacuum gauges 165.

The barometric pressure sensor 187 also connects to the CPU 380 to provide the CPU 380 with absolute atmospheric pressure data necessary to calculate absolute and differential pressure indications over a wide-range.

The CPU 380 calculates absolute and differential pressure in the vacuum system 302 based on data output from the combination vacuum gauge 165. Specifically, the ionization gauge 110 collector current is converted by the CPU 380 into an absolute ultrahigh vacuum reading using calibration parameters stored in the gauge EEPROM 140. The heat-loss sensor's 120 voltage and current data are converted by the CPU 380 into an absolute high vacuum reading using the temperature compensating calibration parameters stored in the gauge EEPROM 140. The differential diaphragm sensor 130 voltage output is converted by the CPU 380 into a differential low vacuum reading using the calibration parameters stored in the gauge EEPROM 140. This differential low vacuum reading may then be converted to an absolute pressure indication by combining the differential low vacuum reading with the absolute atmospheric pressure reading of the barometric pressure sensor 187.

In order to convert the differential diaphragm sensor 130 reading to an absolute pressure reading, the zero offset value of the differential diaphragm sensor 130 must first be removed. This is accomplished by subtracting out the residual output of the differential diaphragm sensor 130 when the vacuum system is open to atmosphere. Thus, the equation for obtaining an absolute pressure reading takes the following form:

$$P_{abs} = P_{barometric} + K(P_{diff} - A) \tag{1}$$

where $P_{barometric}$ = data output from the barometric pressure sensor 187 (calibrated knowing actual absolute atmospheric pressure);

$P_{diff}$ = data output from the differential diaphragm sensor 130;

A=zero offset error of the differential diaphragm sensor 130, i.e., the residual output from the differential diaphragm sensor 130 when the vacuum system is open to atmosphere; and K=calibrated gain.

The appropriate calibrated gain is determined by driving $P_{abs}$ to 0 and solving for K. Thus, the calibrated gain K may be determined according to the following equation:

$$K = -P_{barometric}/(P_{diff} - A) \text{ at vacuum } (P_{abs} = \sim 0) \quad (2)$$

The heat-loss sensor 120 may be used to detect when the absolute pressure indication is well below 1 Torr, which is effectively 0 for the differential diaphragm sensor 130. Then, the gain is adjusted according to equation (2) after inserting appropriate values for A, $P_{diff}$, and $P_{barometric}$. Thus, the differential diaphragm sensor reading may be converted to a calibrated absolute reading by inserting into equation (1) the zero offset value (A), the calibrated gain (K), and the readings from the differential diaphragm sensor 130 and the barometric pressure sensor 187.

Depending on the pressure in the vacuum system 302, the CPU 380 generates absolute and differential pressure readings by selecting the absolute pressure reading of the appropriate sensor and computing a differential pressure reading from the absolute pressure readings. In an overlap region where two sensors have overlapping pressure indication ranges, the differential and absolute pressure readings are combined to provide a smooth transition between the pressure readings of the two sensors. As a result, the combination vacuum gauge according to the present invention provides both differential and absolute pressure readings over three ranges using only three gauges exposed to the measurement region and a simple barometric pressure sensor exposed to the ambient atmosphere.

When the pressure in the vacuum system 302 goes into or out of the vacuum range of the ionization gauge 110, the CPU 380 sends a signal 360 to the power supply and emission control block 325 to turn the ionization gauge 110 on or off.

Figure 4:
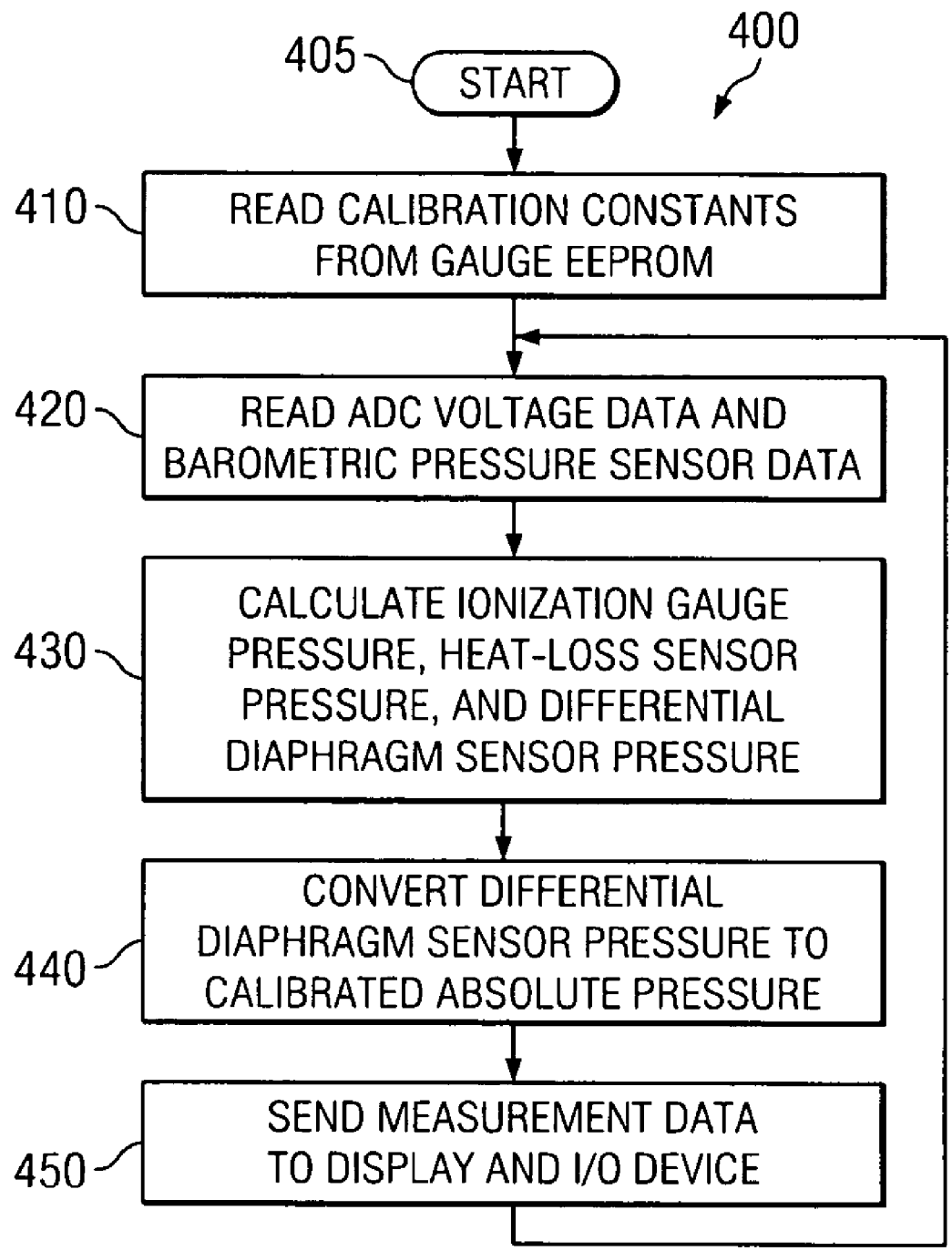
FIG. 4 is a flow chart illustrating the operation of the combination vacuum gauge system.

Referring to FIG. 4, a process 400, implemented by computer instructions executed on the CPU 380 of FIG. 3, converts raw sensor data (e.g. volts, amps, serial data) into vacuum data to be displayed on a pressure display 395 and to be output to an external device via input/output circuitry 350 and a user interface connector 399 of FIG. 3.

The process for measuring absolute and differential pressure in a vacuum system 400 begins in step 405. In step 410, the CPU 380 reads the calibration parameters for the vacuum sensors, including the temperature compensating calibration parameters for the heat-loss sensor, from the gauge EEPROM 140. In step 420, the CPU 380 reads the analog to digital converter data signals 385 for the three sensors 110, 120 and 130 (FIG. 3) and the barometric pressure sensor data. In step 430, the CPU 380 calculates the ionization gauge pressure, the heat-loss sensor pressure, and the differential diaphragm sensor pressure. In step 440, the CPU 380 converts the differential diaphragm sensor pressure to calibrated absolute pressure according to equation (2). In step 450, the measurement data is sent to a display and to an input/output device and the process returns to step 420.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for measuring gas pressure in a measurement region comprising:

a vacuum gauge exposed to pressures in the measurement region;

a barometric absolute pressure sensor exposed only to ambient atmosphere outside the measurement region; and a processor coupled to the vacuum gauge and the barometric absolute pressure gauge, the processor providing absolute and differential gas pressure indications.

2. The apparatus according to claim 1, wherein the vacuum gauge is an absolute vacuum gauge.

3. The apparatus according to claim 1, wherein the vacuum gauge is an absolute low vacuum gauge, further comprising an absolute high vacuum gauge coupled to the processor, the processor providing absolute and differential gas pressure indications in the ranges of high and low vacuum, the absolute low vacuum gauge and the absolute high vacuum gauge having a common port.

4. The apparatus according to claim 3, wherein the absolute high vacuum gauge is a heat-loss sensor.

5. The apparatus according to claim 3, further comprising an absolute ultrahigh vacuum gauge coupled to the processor.

6. The apparatus according to claim 5, wherein the absolute ultrahigh vacuum gauge is an ionization gauge.

7. The apparatus according to claim 3, wherein the absolute low vacuum gauge is a diaphragm sensor with one side sealed off at high vacuum.

8. The apparatus according to claim 3, wherein the data output from the absolute high vacuum gauge and the absolute low vacuum gauge overlap.

9. The apparatus according to claim 1, wherein the vacuum gauge is a Bayard Alpert type ionization gauge.

10. A method for measuring gas pressure in a measurement region comprising:

exposing a vacuum gauge to pressures in the measurement region;

exposing a barometric absolute pressure sensor only to ambient atmosphere outside the measurement region; and providing absolute and differential gas pressure indications based on data output from the vacuum gauge and the barometric absolute pressure sensor.

11. The method according to claim 10, wherein the vacuum gauge is an absolute vacuum gauge.

12. The method according to claim 10, wherein the vacuum gauge is an absolute low vacuum gauge, further comprising exposing an absolute high vacuum gauge, through a port shared with the absolute low vacuum gauge, to pressures in the measurement region.

13. method according to claim 12, wherein the absolute high vacuum gauge is a heat-loss sensor.

14. The method according to claim 12, further comprising exposing an absolute ultrahigh vacuum gauge to pressures in the measurement region.

15. The method according to claim 14, wherein the absolute ultra high vacuum gauge is an ionization gauge.

16. The method according to claim 12, wherein the absolute low vacuum gauge is a diaphragm sensor with one side sealed off at high vacuum.

17. The method according to claim 12, wherein the data output from the absolute high vacuum gauge and the absolute low vacuum gauge overlap.

* * * * *